(12) United States Patent
Seay (10) Patent No.: US 7,113,584 B2
(45) Date of Patent: Sep. 26, 2006

(54) DIGITAL COMMUNICATION TRANSLATOR

(76) Inventor: John G. Seay, 71 Louie La., Stafford, VA (US) 22554

( * ) Notice: Subject to any disclaimer, the term of this patent is extended or adjusted under 35 U.S.C. 154(b) by 924 days.

(21) Appl. No.: 10/055,937

(22) Filed: Jan. 28, 2002

(65) Prior Publication Data

US 2002/0136393 A1    Sep. 26, 2002

Related U.S. Application Data (60) Provisional application No. 60/278,614, filed on Mar. 26, 2001.

(51) Int. Cl.
*H04M 11/04* (2006.01)
(52) U.S. Cl. .................. 379/353; 379/50; 340/541
(58) Field of Classification Search ............... 379/355.05–355.1, 47, 906, 353; 116/4–6
See application file for complete search history.

(56) References Cited

U.S. PATENT DOCUMENTS

| | | | |
|---|---|---|---|
| 5,134,644 A | 7/1992 | Garton | 379/39 |
| 5,272,465 A * | 12/1993 | Meares, Jr. | 379/40 |
| 5,923,731 A | 7/1999 | McClure | 379/33 |
| 6,272,212 B1 | 8/2001 | Wulforst et al. | 379/199 |
| 6,311,072 B1 | 10/2001 | Barclay | 455/552 |
| 6,758,096 B1 * | 7/2004 | Schon et al. | 73/708 |

FOREIGN PATENT DOCUMENTS

WO    WO0063562 A1 * 10/2000

* cited by examiner

*Primary Examiner*—Daniel Swerdlow
(74) *Attorney, Agent, or Firm*—Robert Platt Bell (57) ABSTRACT

A digital communication translator for redirection of pre-programmed instructions and/or information from a digital alarm communicator system or digital communicator transmitter. The inventive device includes an integrated circuit board containing memory ships with input for a common analog or digital communications circuit and output for the same. An input for a low voltage direct current power. An EEPROM (Electronically Erasable Programmable Read Only Memory) may interact with the activated host communication process and initiate a communication circuit with the redirected receiver. This EEPROM may simulate a receiver to the host transmitter, An EPROM (Electronically Programmable Read Only Memory) may contain a library of various formats and data to assist the EPROM in simulating the appropriate receiver for the host communicator.

20 Claims, 4 Drawing Sheets

DIGITAL COMMUNICATION TRANSLATOR

CROSS-REFERENCE TO RELATED APPLICATIONS

The present application claims priority from Provisional U.S. Patent Application No. 60/278,614 filed on Mar. 26, 2001, and incorporated herein by reference.

FIELD OF THE INVENTION

The present invention relates to alarm systems and more specifically to a digital translator for translating digital signals from alarm systems. In particular, the present invention is directed toward a digital communications translator for redirection of preprogrammed instructions and/or information from a digital alarm communicator signal or digital communicator transmitter to a digital alarm receiver.

BACKGROUND OF THE INVENTION

Alarm systems are well known in the art for use with homes or businesses. In a typical business or home alarm, a number of sensors may be provided to detect various conditions. Examples of these sensors include door and window sensors, motion sensors, glass break detectors, heat and fire sensors, flood sensors and sprinkler system pressure sensors. When one of these sensors is activated (e.g., burglary or fire occurs, or false alarm) the sensor communicates with a control panel.

The control panel, typically microprocessor controlled, may receive sensor signals, as well as signals from sensors indicating sensor tampering, battery status, and sensor maintenance status. From a predetermined program, the microprocessor may determine whether an alarm should be sounded (e.g., Police or Fire), sound the appropriate alarm, and telephone an alarm company to indicate an alarm condition exists.

Most radio frequency (RF) wireless security systems available today, such as those manufactured by Alarm Manufacturing Device Co. (ADEMCO) 165 Eileen Way, Syosset, N.Y. 11791, employ a multiplicity of transmitters in communication with a central receiver control unit. The information transmitted typically describes the state of various transducers or sensors associated with each transmitter, such as smoke, motion, breaking glass, shock and vibration detectors, door, window and floor mat switches, and the like. These transmitters are designed to be inexpensive to manufacture.

Most of these alarm systems are manufactured by a few main alarm system manufacturers. As such, such standardized equipment is relative inexpensive to purchase, maintain, repair and replace. However, some major alarm companies which do large volumes of nationwide business have purchased from these major alarm manufacturers, specialized or "proprietary" versions of these standardized alarm systems.

The reasons for modifying the standardized alarm system are many. For some large alarm companies, the alarm equipment is leased to the consumer, and the alarm company does not want the equipment to be readily used by others. In other instances, where the alarm equipment is sold to the consumer, the use of a "proprietary" version of the alarm system makes it more difficult for the consumer to switch to different alarm monitoring companies.

It should be noted that the term "proprietary" as used here (and as is used in the alarm industry) does not necessarily imply that these modified alarm systems employ any protected intellectual property (e.g., Patents, Copyrights, trade secrets) above and beyond the underlying standard alarm system technology. Rather, the changes to the system to make it "proprietary" relate more to changing the coding used to report alarms, pre-programming of telephone numbers and the like (e.g., 1-800 number to report alarms) and coding used to communicate from the alarm monitoring company to the alarm system (for maintenance and the like).

By slightly altering this coding (e.g., via PROM chip within the control panel or the like) the alarm company has made it much more difficult for a third party alarm monitoring company to monitor the alarm system. Extensive re-programming may be required by a service technician at the site to reprogram the alarm dial-up numbers and alarm codes to conform to the third party alarm monitoring companies numbers and codes.

Such reprogramming may require temporary installation of a programming control panel, as typical consumer control panels may not provide sufficient feedback for programming purposes (e.g., limited display capabilities). Moreover, such programming requires the skills and experience of a knowledgeable technician in the field. Such knowledgeable technicians are hard to come by, expensive to train, and difficult to retain. Improper programming can result in all alarm system settings being lost and even the system being locked out, requiring extensive manual re-programming and "learning" by activating each sensor in the system.

Moreover, the hourly rate of a skilled alarm technician is higher than a standard alarm technician. Thus, if a third party alarm company wants to "convert" a customer (with proprietary equipment) from a major alarm company, considerable cost must be incurred to re-program the consumer's alarm system. As a third party alarm monitoring company may be competing on price, this re-programming adds cost to the alarm company's bottom line, making them less competitive, which is exactly the reason the major alarm companies use proprietary systems in the first place—to keep customers captive.

Moreover, in some instances, it may not be possible at all to reprogram the alarm system. The alarm system may be so modified (or indeed, custom made for the major alarm company) that it cannot be reprogrammed for use with any other alarm company. In such a scenario, the third party alarm company would have to install a whole new alarm system (or at least a new control panel) which may not be cost-effective.

Without competition in the marketplace, the consumer may find themselves in a difficult situation—stuck with an expensive alarm system that would be prohibitive in cost to replace, and stuck with an alarm monitoring company that may be providing inadequate service at whatever prices it chooses to dictate.

A solution which would allow for greater consumer choice would improve competition in the marketplace. Such a solution should be easy to install, inexpensive, and not require the services of a skilled alarm technician.

It can be appreciated that digital data communicators have been in use for years. However, a digital translator for an alarm system is not known to exist. The main problem with digital communicators is that they require a considerable amount of time to be installed by a skilled technician. Another problem is that a digital alarm communicator system manufactured in the past may not have the ability to accept new dialing patterns or other changes as required by the communications industry (e.g., move to 10-digit phone numbers or the like).

Another problem with a digital alarm communicator system manufactured in the past may be the requirement that communication only occur with a digital alarm communicator receiver that was manufactured by a specific company. Thus, for example, if an alarm monitoring company wishes to monitor a number of different customers who use different brands of equipment, the alarm company may need to purchase separate central station monitoring equipment for each brand of alarm monitored.

This central station monitoring equipment (i.e., equipment at the alarm company monitoring headquarters) can be fairly expensive to purchase. Moreover, the use of different brands of monitoring equipment requires having the skills to repair and maintain the different brands of central station monitoring equipment. Alarm monitoring personnel may need to be trained on different types of equipment and monitor different equipment simultaneously. In addition, since each system may be separate, it may be difficult to provide a single display or interface to the alarm monitor personnel or to record or log alarms in a single central system.

Another problem with a digital alarm communicator system is that some manufacturers of digital alarm communicator systems have ceased supporting the dialers or other hardware or have gone out of business—consequently leaving the consumer with no choice but to replace installed equipment with new equipment. Another problem with existing products is that the original installing company may have gone out of business, depriving the new provider of essential information necessary to reprogram the existing system.

Digital data translators per se, are known in the art. For example, Barclay, U.S. Pat. No. 6,311,072, issued Oct. 30, 2001 and incorporated herein by reference, discloses an apparatus for translating between telephone signalling protocols. However, this system, assigned to Lucent Technologies, appears to be designed more for interfacing complete telephone systems together, rather than interfacing between two devices on the same phone system.

Thus, the apparatus of Barclay is a fairly complex device (e.g., using Sun Sparc workstations) designed for a specific type of interface between two phone systems. In contrast, in the Alarm industry, there is a need to interface existing alarm systems of many different types to a receiver system at a very low installed cost. A complex interface network such as in Barclay (assuming arguendo such a system would even be applicable) would be too specialized and costly to use.

SUMMARY OF THE INVENTION

While the systems of the Prior Art may be suitable for the particular purpose for which they were intended, they are often not suitable for redirection of preprogrammed instructions and/or information from a digital alarm communicator system or digital communicator transmitter. In these respects, the digital communicator translator according to the present invention substantially departs from the conventional concepts and designs of the electronic security industry, and in doing so, provides an apparatus primarily developed for the purpose of redirection of preprogrammed instructions and/or information from a digital alarm communicator system or a digital communicator transmitter.

In view of the foregoing disadvantages inherent in the known types of digital communicators now present in the prior art, the present invention provides a new digital communicator translator construction wherein the same may be utilized for redirection of preprogrammed instructions and/or information from a digital alarm communicator system or digital communicator transmitter.

The general purpose of the present invention, which will be described subsequently in greater detail, is to provide a translator as a bridge between a host dialer/communicator and a digital alarm receiver (e.g., central station alarm company monitoring system). This translator as mentioned heretofore and many novel features result in a new digital communication translator concept. The overall device may be inexpensively made and compactly packaged and may be programmed to recognize (or be set to recognize) a number of different alarm types.

If a user of a "proprietary" alarm system wishes to change alarm monitoring system providers, a technician need only insert the apparatus of the present invention in the phone line connecting the alarm system to the telephone network interface. No reprogramming of the alarm system is required. The apparatus of the present invention will receive dialing instructions (e.g., DTMF tones) and digital data from the alarm system and automatically translate these into new dialing instructions and data for the new alarm monitoring provider company. Thus, a low skilled or unskilled technician (or indeed, even a consumer) may be able to install the apparatus of the present invention and render a "proprietary" system non-proprietary.

To attain these goals, the present invention generally comprises an integrated circuit board containing memory chips (ROM, PROM, EPROM, EEPROM, or the like) with input for a common analog and/or digital communications circuit and output for the same. Power may be supplied by a low voltage direct current source (e.g., wall pack transformer, internal battery, or the like) or may be tapped directly from telephone line voltage, or tapped from the power supply of the alarm control panel.

In the preferred embodiment, an EEPROM (Electronically Erasable Programmable Read Only Memory) chip will interact with the activated host communication process and initiate a communication Ad circuit with the re-directed receiver. This EEPROM will simulate a receiver to the host transmitter. An EPROM (Electronically Programmable Read Only Memory) may provide a library of various formats and data to assist the EPROM in simulating the appropriate receiver for the host communicator.

There thus has been outlined, rather broadly, the more important features of the present invention in order that the detailed description thereof may be better understood, and in order than the present contribution to the at may be better appreciated. There are additional features of the present invention which may be described hereinafter.

In this respect, before explaining at least one embodiment of the present invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of the description and should not be regarded as limiting.

One object of the present invention is to provide a digital communication translator which will overcome the shortcomings of alarms systems presently manufactured.

It is a further object of the present invention to provide a digital communication translator for redirection of preprogrammed instructions and/or information from a digital alarm communicator system of digital communicator transmitter.

It is a further object of the present invention to provide a digital communication translator what is easily installed by any qualify entry-level junior or journeyman technician.

It is a further object of the present invention to provide a digital communication translator which has the ability to dial ten or more digits of telephone numbers.

It is a further object of the present invention to provide a digital communication translator which interrogates a transmitting station and simulates a receiving station.

It is a further object of the present invention to provide a digital communication translator which extends the operational life of equipment no longer supported by a manufacturer.

It is a further object of the present invention to provide a digital communication translator which prevents the unnecessary replacement of a digital alarm communicator system and/or digital alarm communicator transmitters.

It is a further object of the present invention to provide a digital communication translator which extends the useable life of electronic dialing equipment and provides an effective price-conscious alternative to the owner of the communicating device.

It is a further object of the present invention to provide a digital communication translator which provides multiple options for the most effective data transmission method.

Other objects and advantages of the present invention will be more readily apparent to the reader and it is intended that these objects and advantages all fall within the spirit and scope of the present invention.

To accomplish the above and related objects, the present invention may be embodied in the form illustrated in the accompanying drawings. Attention should be called to the fact that the drawings are illustrative only, and changes may be made to the specific construction illustrated without departing from the spirit and scope of the present invention.

DETAILED DESCRIPTION OF THE INVENTION

For the purposes of this application, the term "Digital Alarm Communication System" is defined as an alarm system component in which signals are transmitted from a digital alarm communication transmitter (DACT) located at the protected premises through the public switched telephone network (PSTN) to a digital alarm communications receiver (DACR).

The DACR may be located at the alarm company monitoring station and accepts and displays signals from the DACT sent over the public switched telephone network. The DACT is coupled to initiating devices (e.g., alarm switches and sensors) and will seize the connected telephone line, dial a preselected number to connect to a DACR and transmit signals indicating a status change of the initiating device.

The digital communication translator of the present invention may be installed at the transmitting premises. The translator may be installed on the DACT telephone line.

Upon initialization or activation of the host communication (alarm system), the translator will commence operation. The translator will acknowledge receipt of the dialed host telephone number by replying to the host with a signal. This signal is commonly called a "handshake" in the electronic security and telecommunications industries. The translator will commence operation by dialing a preprogrammed telephone number and establishing a pathway with the DACR.

It should be noted that the DACT will not be aware that it has not connected with its programmed alarm company monitoring DACR. The operation of the digital communications translator will be transparent to the DACT. The DACT will continue to operate as if it were connected to the alarm company for which it was programmed for, and send and receive codes in that alarm company's program code protocols.

To receive digital communication from one device, to simulate a digital communication receiver, to identify the dialed telephone number that the originating device is dialing, the following steps may be performed.

To identify the activation of the host system dialing a telephone number, the translator will translate or redirect this call as programmed, to a different telephone number. The translator may identify a unique number, particular to the originating device and translate this unique number to a number unique to the forwarded receiver. The translator will then identify the data flow being sent by the host communicator and forward this data to the new receiver.

The translator may generate or forward to the host communicator an acknowledgement signal (handshake) indicating successful establishment of a communication pathway that is acceptable to the originating device. The translator may then generate or forward to the host communicator, a data successfully transmitted signal (kiss off) indicating the successful completion of an electronic data transfer that is acceptable to the originating device. In this manner, the operation of the system may be "transparent" to the host communicator and the receiver.

Figure 1:
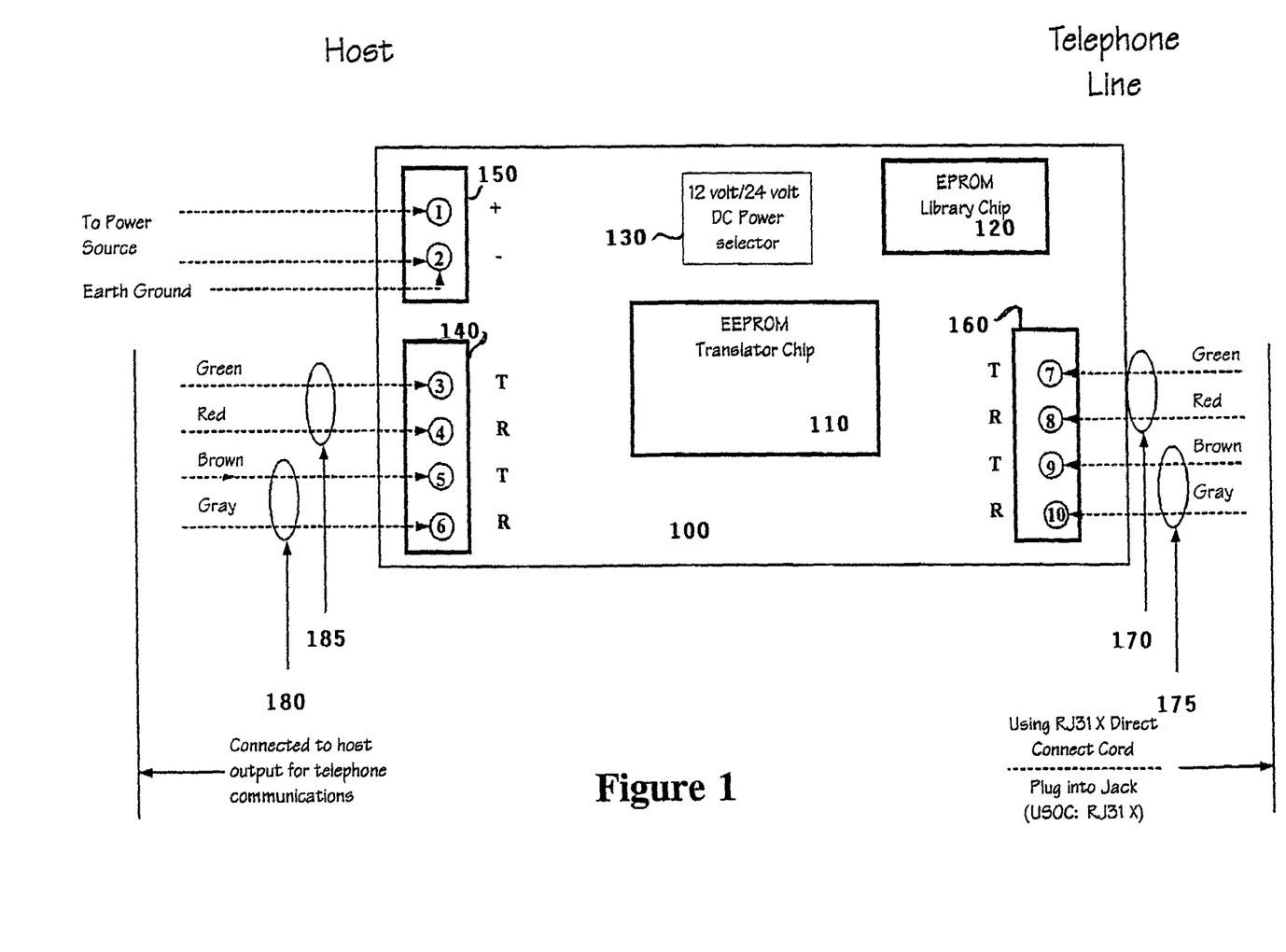
FIG. 1 is a block diagram of a first embodiment of the digital communicator translator of the present invention.

FIG. 1 is a block diagram of a first embodiment of the digital communicator translator 100 of the present invention. Digital communicator translator 100 may comprise an integrated circuit board containing memory chips 110, 120 with input for a common analog and/or digital communications circuit and output for the same. Power may be supplied by a low voltage direct current source 150 such as a battery, wall-pack transformer, connection to the power source of an alarm system, or the like.

EEPROM (Electrically Erasable Programmable Read Only Memory) chip 110 may interact with the activated host communication process and initiate a communication circuit with the redirected receiver. EEPROM 110 may simulate a receiver to the host transmitter by acting as a look-up-table (LUT). The translator chip may comprise an EEPROM with a fast and large capacity for information. It will trigger, upon receipt of an electronic signal from the host system. Digital data received from the alarm system (HOST) may be used as a memory address in EEPROM 110. The contents of memory at that memory address will serve as the output digital data (translated data) the telephone line.

In a similar manner analog dialed DTMF telephone numbers (Dual Tone, Multiple Frequency, or "touch-tone") may be converted to digital memory addresses in EEPROM 110. The contents of the memory at that address may be a new, redirected telephone number. In the preferred embodiment, the apparatus may be pre-programmed to dial one number (the number of the new alarm provider) in response to any DTMF input from the host.

EPROM (Electrically Programmable Read Only Memory) 120 may contain a library of data in various formats to assist EEPROM 110 in simulating an appropriate receiver for the host communicator. It should be noted that the use of EPROM 120 may be optional, as EEPROM 110 may be preprogrammed at the factory, or by a technician, using a removable EPROM or an EEPROM programmer to program EEPROM 110 for a particular alarm system (or alarm system provider) for conversion.

In the preferred embodiment, however, EPROM 120 may be used to automatically detect the type of alarm system or alarm company for which the alarm system was configured, and select the appropriate library of data to download to EEPROM 110 to correctly translate alarm system digital data to the new alarm monitoring company standards.

One way of selecting library data from EPROM 120 may be through DTMF data. Each alarm company uses one or more telephone numbers for its monitoring services. For many national firms, these may be 1-800 or other types of toll-free numbers. When the alarm system dials out to its pre-programmed telephone number, the digital communications translator may determine from the number called, which alarm company the alarm system was pre-programmed for, and select the correct library of conversion data to be downloaded to EEPROM 110. Once EEPROM 110 has been loaded, no further detection or downloading may be required for subsequent calls.

Alternately, the type of alarm system (or alarm company the alarm system is programmed for) may be detected from the nature of the digital data sent by the alarm system. Proprietary alarm codes and handshake signals may identify alarm system type and programming. Alternately, a technician may pre-program digital communications translator 100 for a particular known alarm system (or alarm company the alarm system is programmed for) using DIP switches or the like, or by downloading appropriate data to EEPROM 110 from a removable EPROM 120 or other data source. Data may even be downloaded to EPROM 110 from a the telephone line.

Thus for example, a consumer owns an alarm system purchased from ACME alarm company. This alarm system is programmed to call the ACME alarm monitoring center and transmit digital data in a proprietary ACME alarm monitoring format. Rather than reprogram the entire alarm system, a technician from BRAND X alarm company simply inserts digital communication translator 100 in the phone line between the ACME alarm and the TELCO network interface.

When the ACME alarm dials out, digital communication translator 100 determines from the DTMF tones that the alarm system is an ACME system and downloads the correct data from EPROM 120 into EEPROM 110 to correctly translate the proprietary ACME alarm codes into BRAND-X format. In addition, digital communications translator 100 dials out to the BRAND-X alarm monitoring center.

When the call is connected, each command data received from the ACME alarm is used as a memory address to EEPROM 110. Data from EEPROM 110 at that memory address is output to the BRAND-X alarm system as translated digital data. In a similar manner, any data transmitted "downstream" from the BRAND-X alarm monitoring center may be converted back into ACME command and control codes using a different portion of EEPROM 110, a separate EEPROM, or memory mapping techniques.

Once data is downloaded from EPROM library chip 120 to EEPROM 110, it need not be downloaded again, unless the device is to be reused in another system. It should be noted that other types of memory may be used in place of EPROM 120 and EEPROM 110. For example, EPROM 120 could be a PROM or EEPROM or other type of non-volatile memory (e.g., flash memory or the like). EEPROM 110 may comprise any type of memory. For example, inexpensive RAM could be used for EEPROM 110. However, in such a scenario, whenever power is interrupted from the device, EPROM 120 would have to reprogram EEPROM 110.

Digital communications translator 100 may be installed in the existing connection to a telecommunications circuit. The communications circuit may comprise a RJ31X blocks 140 and 160. Block 140 may include first and second phone lines 180 and 185. Block 160 may include first and second phone lines 170 and 175. In practice, only one of the first and second phone lines may be needed at each block (i.e., single twisted pair).

Figure 2:
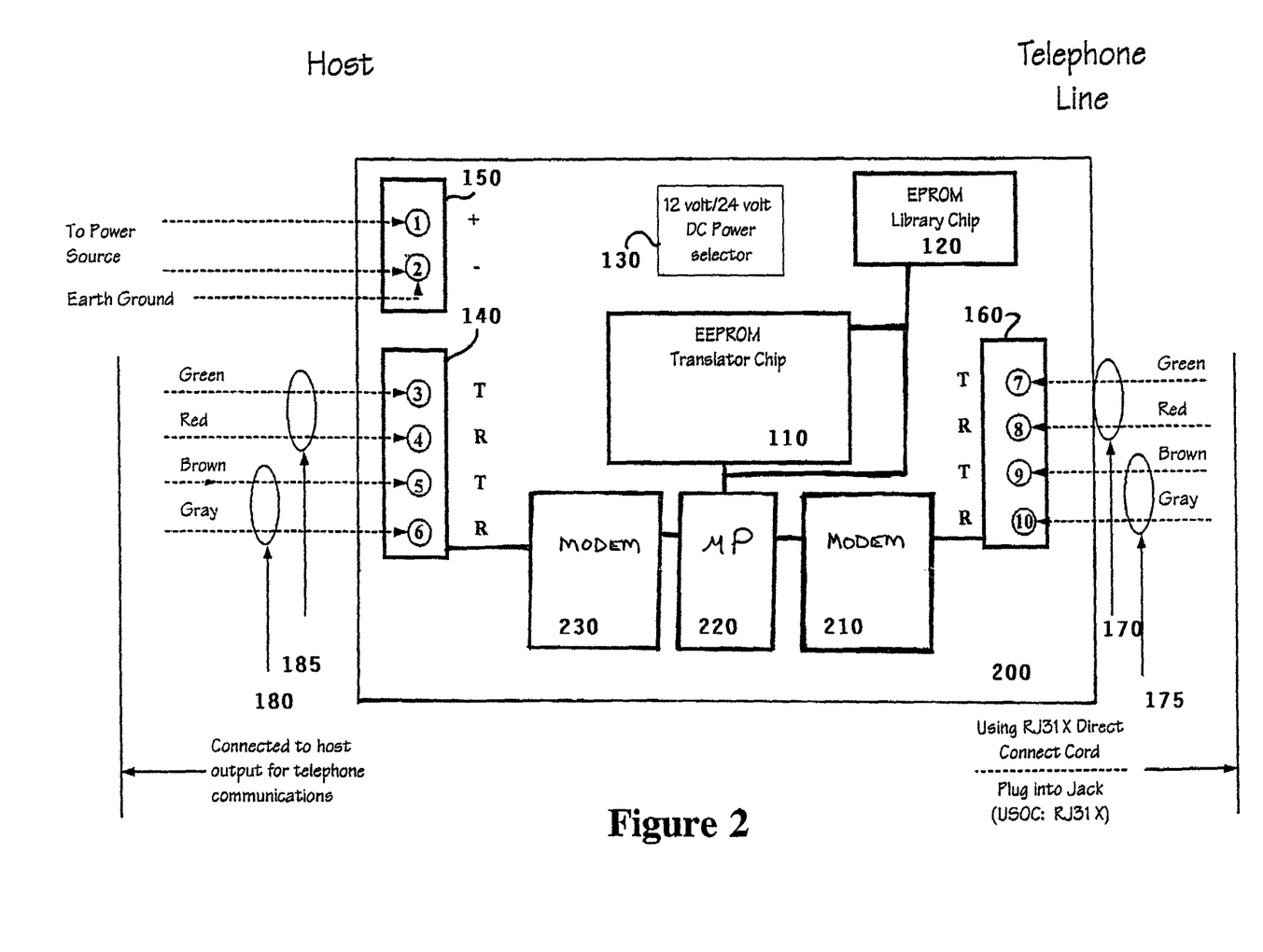
FIG. 2 is a block diagram of a second embodiment of the digital communicator translator of the present invention.
Figure 3:
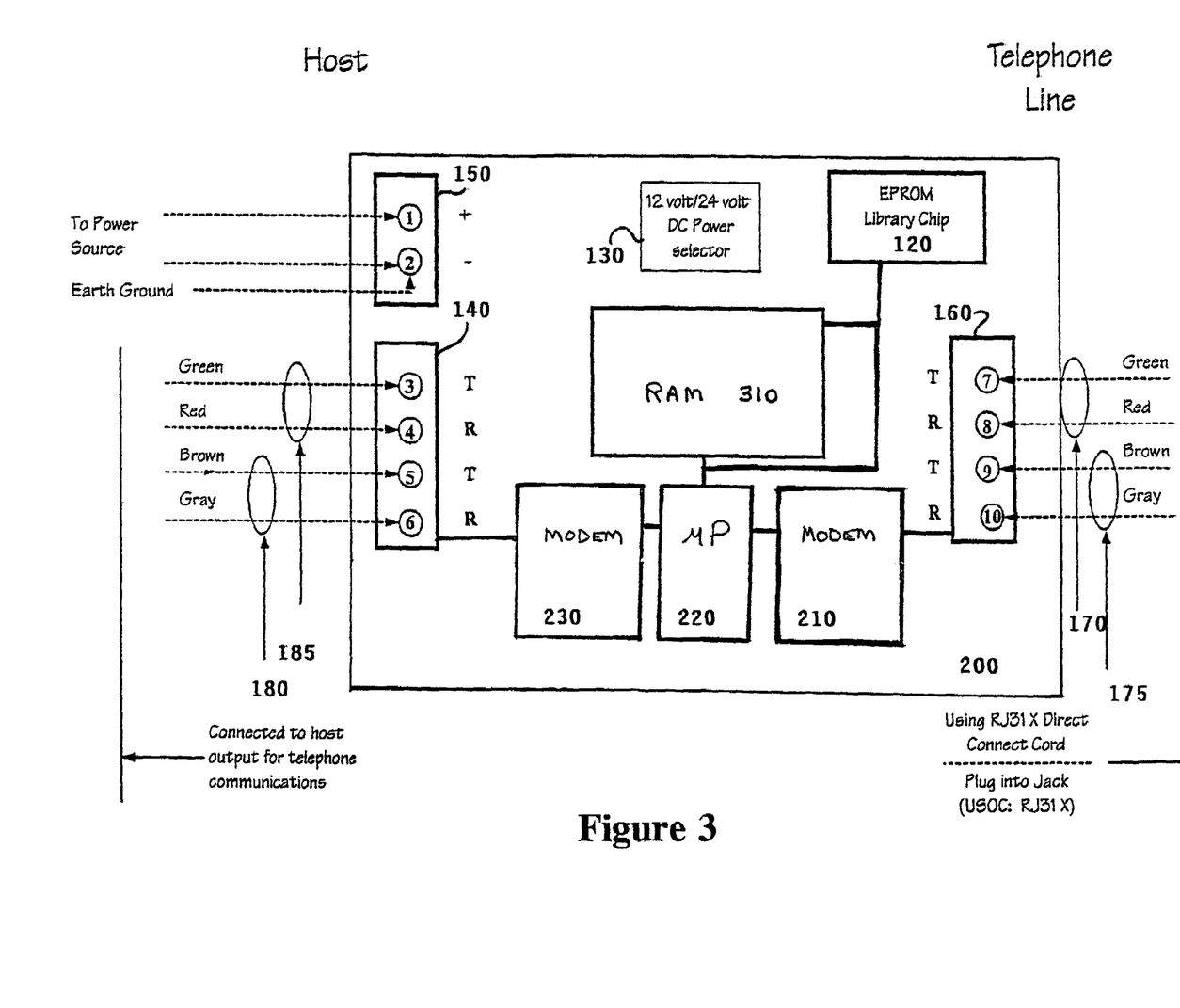
FIG. 3 is a block diagram of a third embodiment of the digital communicator translator of the present invention.

FIG. 2 is a block diagram of a second embodiment of the digital communicator translator of the present invention. It should be understood that the diagram of FIG. 1 is schematic in nature, that is to say, illustrates the highlights of the present invention, and in no way should be taken as limiting the spirit and scope of the present invention. One or ordinary skill in the art would be able to construct the apparatus of the present invention from the diagram of FIG. 1. FIGS. 2 and 3 set forth some particular implementations of the embodiment of FIG. 1 that might be constructed by an artisan skilled in the art.

In the embodiment of FIG. 2, specific hardware is illustrated to facilitate operation of the apparatus of FIG. 1. Like components with FIG. 1 are illustrated with like numerals. In the apparatus of FIG. 2, a first modem 230 may be coupled to the host alarm system through block 140 via either of (or both of) first and second phone lines 180 and 185.

Modem 230 may be coupled to microprocessor 220. Microprocessor 220 may comprise a relatively inexpensive and simple (by today's standards) microprocessor, such as the venerable Intel 8050 series processor, commonly used in industrial control applications. Microprocessor 220 may receive programming instructions from EEPROM 110 and/or EPROM 120.

When the host alarm system attempts to call out, modem 230 may signal microprocessor 220, which may then generate an outgoing call through modem 210 through block 160. Modem 210 may detect when the call is answered by the alarm monitoring center and receive an handshake signal from the alarm monitoring center. This handshake signal may be translated (if required) by microprocessor 220, using data from EEPROM 110 or EPROM 120 (e.g., as a lookup table). Data transmitted from the host to the alarm monitoring center and vice versa may be similarly translated.

Modems 230 and 210 may comprise a physical modem chip, or may comprise a so-called "software modem" implemented by a microprocessor such as microprocessor 220. Modems 230 and 210 need not have a high data bandwidth (e.g., V.90 modem or the like) as the amount of data transmitted from the alarm to the monitoring station and back may be de minimis (e.g., identification code, alarm code, alarm level, error codes, and the like). Thus, simple and inexpensive modems may be employed.

Similarly, in the embodiment of FIG. 2, a single memory may be employed, or additional memory may be employed. For example, EPROM library chip 120 may be used singly, and microprocessor 220 may address different portions of EPROM library chip 120 depending upon which type of alarm system (or alarm company the alarm system is programmed for) is detected. Alternately, or in addition, a RAM may be provided in place of, or augmenting EEPROM 110.

In an alternative embodiment, translation data may be downloaded from the alarm company monitoring station to the digital communications translator. When an initial call is made from the alarm system, microprocessor 220 may instruct modem 210 to telephone the central monitoring station. A processor at the central monitoring station may receive such communication from microprocessor 220 and download translation data to microprocessor 220, which in turn may be stored in EEPROM 110. However, such a system may require modification of headend (alarm monitoring station) hardware and thus may be less desirable than the preferred embodiment.

FIG. 3 is a block diagram of a third embodiment of the digital communicator translator of the present invention. Elements in the embodiment of FIG. 3 in common with those of FIGS. 1 and 2 have commonly numbered elements and their description will not be repeated herein.

In the embodiment of FIG. 3, EEPROM 110 has been replaced by a Random Access Memory 310. Operation of the apparatus is similar to that in FIGS. 1 and 2. However, in the embodiment of FIG. 3, microprocessor 220, operating a program stored in EPROM 120, may determine the type of alarm system the translator is connected to from phone number or data type, and download translation data (if required) into RAM 310. Data transmitted from the host alarm system may then be translated using data in RAM 310 and forwarded to the new alarm company.

It should be noted that the term "translation" may include transmitting data unmodified from the host alarm system to the new alarm company receiver. In many instances, even proprietary alarm systems may share some or all of the data codes as their non-proprietary counterparts. In such a scenario, in the present invention, some or all codes may be passed directly (or by 1:1 translation) to the new alarm provider.

It should also be noted that the alarm system of the present invention may also be used in situations where an existing alarm system is to be connected to the same alarm monitoring company. For example, if na alarm system becomes obsolete, or the alarm monitoring company installs new monitoring equipment, the translator of the present invention may be useful in interfacing existing or non-compatible equipment to such monitoring equipment.

Figure 4:
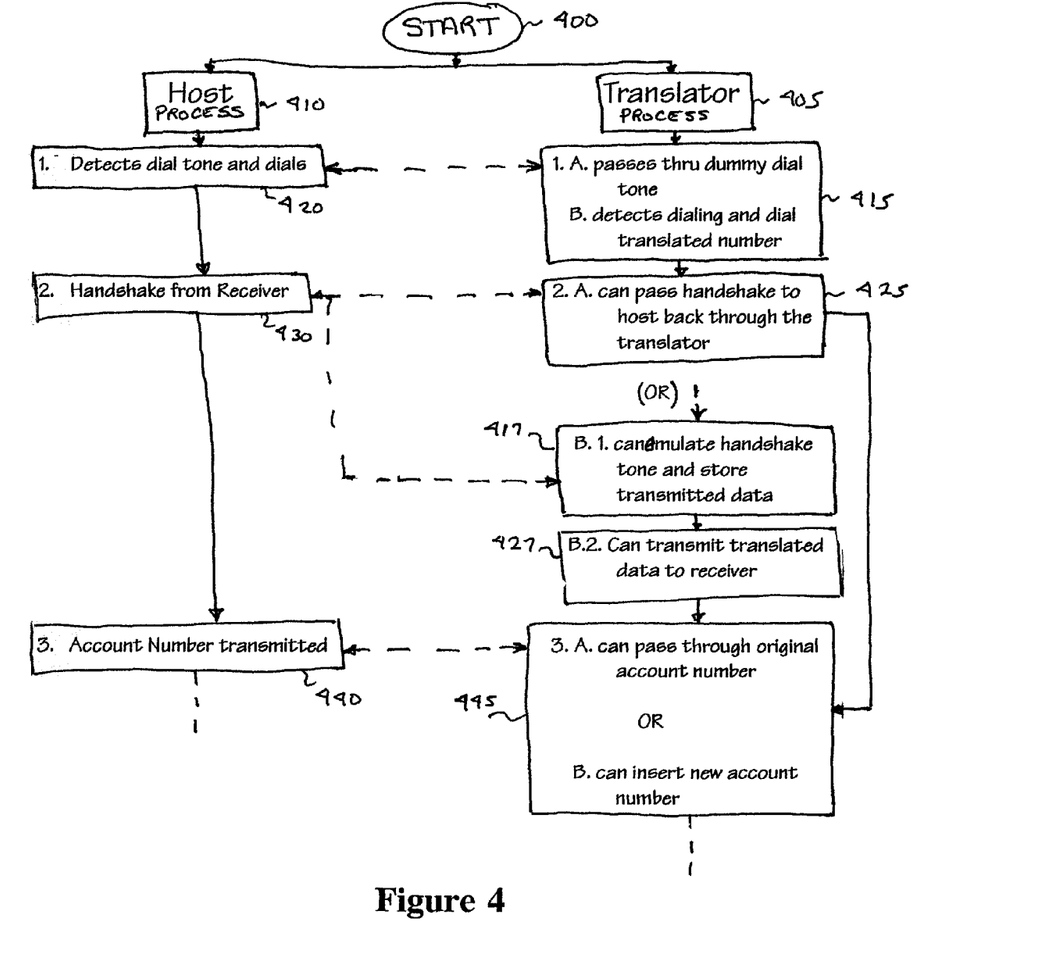
FIG. 4 is a flowchart illustrating two options for translating data.

FIG. 4 is a flowchart illustrating two options for translating data. In the process flowchart of FIG. 4, the process is divided into Host Processes (i.e., processes taking place in the host alarm system) and Translator Processes (i.e., processes taking place in the translator of the present invention). In the flowchart of FIG. 4, two alternative Translator Processes are illustrated. The translator may be programmed for operation in one or both modes, or may be selectable (or select itself) for either mode of operation as conditions and installation dictates.

In step 400, the process starts. In host process 410, the alarm system captures a phone line and searches for a detects a dial tone as illustrated in step 430. In translator process 405, the translator detects that the host is attempting to seize the phone line and passed through a dummy dial tone to the host as illustrated in step 415. When the host starts dialing in response to this dummy dial tone, the translator seizes an outside phone line and dials its pre-stored "translated" phone number (for the new alarm company).

In step 430, the host alarm waits for a handshake signal from the receiver alarm company. Depending upon installation and system requirements, the translator can do one of a number of options. As illustrated in step 425, the handshake from the new alarm company can be passed back to the host through the translator. The process of step 425 assumes that the handshake generated by the new alarm company receiver will be acceptable to the host alarm system. In many situations, such signals are not modified in proprietary versions of alarm systems. Thus, it may be simpler, easier, and more reliable to pass-through a handshake signal rather than try to emulate or fake such a signal.

However, in an alternative embodiment, as illustrated in steps 417 and 427, the translator may emulate a handshake tone and store data transmitted from the host. This emulated handshake tone and data may be sent to the host alarm and emulated responses sent to the new alarm company receiver. Both host alarm and new alarm company receiver both believe they have connected to one another, when in actuality, both have handshaked with the translator. In Step 427 data may then be translated and sent to the receiver.

Either of the options illustrated for handshaking in FIG. 4 may be employed selectively and automatically, if required, depending upon type of alarm system, type of receiver, and installation requirement. In step 445 account number data may be passed through the translator from the host to the receiver. In the alternative, the translator may insert a new account number (preprogrammed into the translator) if required (e.g., old account number already is use or incompatible with existing account number structure). Processing may then continue as illustrated by the dashed lines until data transmission is completed with a "kiss-off" which may be handled in a similar manner to the handshake.

While the preferred embodiment and various alternative embodiments of the invention-have been disclosed and described in detail herein, it may be apparent to those skilled in the art that various changes in form and detail may be made therein without departing from the spirit and scope thereof.

The translator may be installed in the existing connection to a telecommunications circuit. Presently, the communications circuit is connected to a recommended RJ31X block, as illustrated in FIG. 1. The translator may be inserted into the communication circuit prior to the presently installed communicator. In an alternative embodiment of the library chip would be the introduction of library data into the translator chip from a temporary source. Another alternative to the translator chip would be placement of a permanently directed telephone circuit for all communications to be redirected. Another alternative embodiment would include the introduction of security features to prevent the misuse of the device by unauthorized personnel. In another alternative embodiment, would be to simulate the function of the process being resident at the new redirected receiver.

In addition, other features may be added to the translator of the present invention. For example, the translator may be provided with means to circumvent an answering machine (e.g., handing up an answering machine with a # symbol or other technique). A similar technique may be used to circumvent a computerized attendant (e.g., voicemail). Tamper-proofing may prevent the apparatus from being bypassed. If a tamper is detected (e.g., tamper switch or the like) the host may be scrambled to an alarm condition and then prevented from being disarmed when the translator has been tampered with.

In addition, the capability of uploading and downloading data to and from the translator and host alarm may be provided. The host alarm system may thus be remotely programmed, using standard alarm programming codes, which may be translated into proprietary alarm codes if required. In addition, data may be downloaded into the translator if required. In particular, the translator may be provided with no translator data upon startup ("dumb translator"), and may download translator data from the receiver after uploading handshake or phone number data or the like to the receiver so that the receiver can determine what type of translation is required.

In addition, a remote shutdown ability may be provided to disable the translator. For example, if a customer decides to change companies again, the alarm company can disable the translator remotely rather than send a technician out to retrieve the translator. The translator may be inexpensively made so as to be disposable in such a scenario.

In addition, the translator may be operated from AC or DC power. Power may be directed from the power terminals on the host alarm system (AC or DC) or may be provided from a wall-pack transformer or the like. In the alternative, the apparatus may be powered by battery power (e.g., lithium battery or the like) or other DC power source, or even phone line power.

In yet another embodiment, the system may be programmed to accept voice inquiries or DTMF input. In such a scenario, the translator could be programmed with voice or DTMF recognition software and/or hardware and/or voice generation equipment. A call to the translator could, in response to voice or DTML inputs, provide voice outputs (e.g., alarm status, alarm zone, and the like) and also transmit commands to the host. For example, the translator could be programmed to call a user's or receiver's number and make a voice announcement as to the nature of the alarm based upon data received from the host. A user or alarm company calling back could disable or reprogram the alarm via voice commands or DTMF input (e.g., passcode number or the like). In this manner, an older alarm system could be made more user-friendly and accessible.

In yet another an alternative embodiment a Programmable Logic Array (PLA) may be used in the place of the microprocessor, modems, and EEPROM (and/or EPROM) or any one or combination of those components in the embodiments of FIGS. 1, 2, and 3. Such a PLA may eliminate the need for a general purpose processor and moreover may be preprogrammed (burned) in a format so as to operate in a predetermined mode or modes of operation.

It should also be noted that although the present invention was conceived and developed with the idea of primary use in alarm system technology, the invention is also applicable to other areas of art where signal translation may be required. For example, the apparatus of the present invention may be used to redirect and translate, where required, communications signals from equipment such as ATM machines, fax machines, computer modems, Satellite and Cable TV set-top boxes (e.g., with dial-out PPV or other features), various commercial equipment and the like, where reprogramming of such equipment is either impractical or time-consuming.

Thus, for example, an ATM machine may be switched to a different network using the apparatus of the present invention. Such a machine may "dial out" to a network to perform financial transactions. For security reasons, such machines may be difficult to reprogram for use in other types of ATM networks. A bank wishing to change ATM networks may find it difficult to reprogram such machines and require purchase of all new equipment. With the present invention, an machine may be re-interfaced for a different network. The invention has similar application to lottery machines, electronic cash registers, and other similar devices.

Similarly, credit card "swipe" boxes (card readers), used to perform credit card transactions (alone or in combination with a cash register or computer) may be pre-programmed with the phone number and access codes of a particular bank or credit card processing center. A user (e.g., retail store) may be required to purchase such a box in order to perform retail sales or the like. If the user wishes to switch to a different bank or credit card processing center (e.g., one offering lower rates for transactions), in the past they may have had to reprogram their card readers or purchase new ones. With the present invention, a small translator can be inserted into the phone line (oftentimes by the end user) and phone calls automatically redirected to the new provider (and data translated, if necessary).

In addition, the present invention allows service providers to upgrade equipment at the receiver end without forcing consumers or subscribers to purchase all new equipment or having to maintain a "dual-model" of operation to service new and legacy equipment simultaneously. Thus, for example, a Cable-TV operator wishing to upgrade "head-end" equipment for Pay Per View (PPV) or other services, can install state-of-the-art headend equipment and provide a digital translator to those subscribers using previous generation set-top cable boxes.

Moreover, it should be noted that although dialing and other signals are disclosed here as Dual Tone Multiple Frequency (DTMF, or "Touch-Tone") signals, other types of signals such as dialing pulses may be used on conjunction with or as a substitute for such data types.

We claim:

1. A digital communications translator for alarm systems, comprising:
   a first telephone line interface, for receiving communications signals from a host alarm system over a telephone line;
   a second telephone line interface, for transmitting translated communications signals to a receiver system over a telephone line; and
   a translator, coupled to the first telephone line interface and the second telephone line interface, for receiving communications signals from the host alarm system and translating the communications signals into translated communication signals and outputting the translated communications signals to the receiver system,
   wherein the communications signals comprise digital data signals which comprise alarm system codes and data representing events according to a first alarm system protocol generated by the host alarm system and the translated communications signals comprise corresponding alarm system codes and data representing the events according to a second alarm system protocol programmed into the translator.

2. The digital communications translator of claim 1, wherein the communications signals further comprise Dual Tone Multiple Frequency (DTMF) signals.

3. The digital communications translator of claim 2, wherein the DTMF signals further comprise a telephone number programmed into the host alarm system, and the translated communications signals comprises a DTMF telephone number programmed into the translator.

4. The digital communications translator of claim 1, wherein the digital data signals include one or more of alarm system activation signals, alarm system deactivation signals, and alarm system status signals.

5. The digital communications translator of claim 1, wherein the alarm system codes include one or more of a glass break signal, a window switch signal, a door switch signal, a smoke detector signal, a tamper signal, a low battery signal, or a fire signal.

6. The digital communications translator of claim 4, wherein the digital data signals comprise an old alarm system account number generated by the host alarm system and the translated communications signals comprises a translated new alarm system account number programmed into the translator, wherein the digital communications translator transmits the new alarm system account number in response to receiving at least a portion of the old alarm system account number.

7. The digital communications translator of claim 1, wherein the translator comprises:
   a first memory for storing as a look-up table, translated alarm codes, the first memory addressed using alarm codes received from the host alarm system and outputting a corresponding translated alarm code stored at a memory address.

8. The digital communications translator of claim 7, wherein the translator further comprises:
   a second memory, coupled to the first memory, for storing a library of alarm code translation data for a plurality of host alarm system types.

9. The digital communications translator of claim 7, wherein the translator detects host alarm system type and downloads a corresponding library of alarm code data from the second memory to the first memory for alarm code translation for the detected host alarm system type.

10. The digital communications translator of claim 1,
    wherein the first telephone line interface comprises a first modem, for receiving communications data signals from the host alarm system,
    wherein the second telephone line interface comprises a second modem, for transmitting translated communications to the receiver, and
    wherein the translator comprises a microprocessor and at least one memory, wherein the microprocessor receives a communication signal from the first modem, looks up a translated communication signal in the memory using a memory address generated from the communication signal, and outputs to the second modem a translated communication signal stored at the memory address.

11. A method of translating digital alarm communications over a telephone line, comprising the steps of:
    receiving, over a first telephone line interface, communications signals from a host alarm system over a telephone line,
    receiving, in a translator coupled to the first telephone line interface and a second telephone line interface, communications signals from the host alarm system,
    translating, in the translator, the communications signals into translated communication signals,
    outputting the translated communications signals to the second telephone line interface, and transmitting, over the second telephone line interface, translated communications signals to a receiver system over a telephone line,
    wherein the communications signals comprise digital data signals which comprise alarm system codes and data representing events according to a first alarm system protocol generated by the host alarm system and the translated communications signals comprise corresponding alarm system codes and data representing the events according to a second alarm system protocol programmed into the translator.

12. The method of translating digital communications over a telephone line of claim 11, wherein the communications signals further comprise Dual Tone Multiple Frequency (DTMF) signals.

13. The method of translating digital communications over a telephone line of claim 12, wherein the DTMF signals further comprise a telephone number programmed into the host alarm system, and the translated communications signals comprise a DTMF telephone number programmed into the translator.

14. The method of translating digital communications over a telephone line of claim 11, wherein the digital data signals include one or more of alarm system activation signals, alarm system deactivation signals, and alarm system status signals.

15. The method of translating digital communications over a telephone line of claim 11, wherein alarm system codes include one or more of a glass break signal, a window switch signal, a door switch signal, a smoke detector signal, a tamper signal, a low battery signal, or a fire signal.

16. The method of translating digital communications over a telephone line of claim 14, wherein the digital data signals comprise an old alarm system account number generated by the host alarm system and the translated communications signals comprises a translated new alarm system account number programmed into the translator, wherein the digital communications translator transmits the new alarm system account number in response to receiving at least a portion of the old alarm system account number.

17. The method of translating digital communications over a telephone line of claim 11, wherein said step of translating further comprises the steps of:
    storing, in a first memory as a look-up table, translated alarm codes,
    addressing the first memory using the alarm codes received from the host alarm system, and
    outputting a corresponding translated alarm code stored at a memory address.

18. The method of translating digital communications over a telephone line of claim 17, wherein said step of translating further comprises the step of:
    storing in a second memory, coupled to the first memory, a library of alarm code translation data for a plurality of host alarm system types.

19. The method of translating digital communications over a telephone line of claim 17, wherein said step of translating further comprises the steps of:
    detecting, in the translator, host alarm system type, and
    downloading a corresponding library of alarm code data from a second memory to the first memory for alarm code data translation for the detected host alarm system type.

20. The method of translating digital communications over a telephone line of claim 11,
    wherein said step of receiving over the first telephone line interface comprises the step of receiving communications data signals from a host alarm system over a first modem,
    wherein said step of outputting over the second telephone line interface comprises the step of transmitting translated communications to the receiver over a second modem, and
    wherein said step of translating comprises the steps of:
    receiving in a microprocessor coupled to at least one memory, a communication signal from the first modem,
    looking up, using the microprocessor, a translated communication signal in the at least one memory using a memory address generated from the communication signal, and
    outputting to the second modem from the microprocessor, a translated communication signal stored at the memory address.

* * * * *